US009145043B2

(12) United States Patent
Nellen et al.

(10) Patent No.: US 9,145,043 B2
(45) Date of Patent: Sep. 29, 2015

(54) OPEN ROOF SYSTEM FOR A VEHICLE

(71) Applicant: Inalfa Roof Systems Group B.V., Venray (NL)

(72) Inventors: Marcel Johan Christiaan Nellen, Merselo (NL); Peter Christiaan Leonardus Johannes Manders, Horst (NL)

(73) Assignee: Inalfa Roof Systems B.V., Venray (NL)

( * ) Notice: Subject to any disclaimer, the term of this patent is extended or adjusted under 35 U.S.C. 154(b) by 0 days.

(21) Appl. No.: 14/274,928

(22) Filed: May 12, 2014

(65) Prior Publication Data

US 2014/0246884 A1  Sep. 4, 2014

Related U.S. Application Data

(63) Continuation-in-part of application No. 13/910,563, filed on Jun. 5, 2013.

(30) Foreign Application Priority Data

Jun. 12, 2012 (EP) .................................... 12171663

(51) Int. Cl.
*B60J 7/057* (2006.01)
*B60J 7/00* (2006.01)
*B60J 7/047* (2006.01)

(52) U.S. Cl.
CPC ................ *B60J 7/003* (2013.01); *B60J 7/0015* (2013.01); *B60J 7/0038* (2013.01); *B60J 7/047* (2013.01); *B60J 7/0573* (2013.01)

(58) Field of Classification Search
CPC ........ B60J 7/057; B60J 7/0573; B60J 7/0015; B60J 7/047; B60J 7/0038; B60J 7/003
USPC .................................................. 296/214, 223
See application file for complete search history.

(56) References Cited

U.S. PATENT DOCUMENTS 4,081,926 A * 4/1978 Jardin .............................. 49/210
2004/0080189 A1  4/2004 Schatzler
(Continued)

FOREIGN PATENT DOCUMENTS

DE       10123422    * 12/2001
DE       10327352      1/2004
(Continued)

OTHER PUBLICATIONS

Official Search Report of the European Patent Office in counterpart foreign application No. EP 12171663 filed Jun. 12, 2012.
(Continued)

*Primary Examiner* — Dennis H Pedder
(74) *Attorney, Agent, or Firm* — Steven M. Koehler; Westman, Champlin & Koehler, P.A.

(57) ABSTRACT

An open roof system for a vehicle comprises at least first and second movable elements, each movable between a retracted and a deployed position. At least two drive cable assemblies transfer the motor torque to said movable elements. The drive cable assemblies comprise a flexible first part having first and second ends, the first part being driven by a motor. The first end portion of the flexible first part connects to one of the first and second movable elements, and a first guiding channel guides the second end. The drive cable assembly further comprises an elongated second part, guided in a second guiding channel to one of the first and second movable elements and connected thereto. During at least part of the operation, the elongated second part moves substantially in the same direction as an end portion of the first part of the cable assembly.

25 Claims, 17 Drawing Sheets

(56) References Cited

U.S. PATENT DOCUMENTS

2010/0038932 A1    2/2010   Comfort
2012/0139284 A1    6/2012   Lee
2013/0328355 A1   12/2013   Nellen

FOREIGN PATENT DOCUMENTS

FR     2926496    7/2009
FR     2926497    7/2009

OTHER PUBLICATIONS

Office Action for U.S. Appl. No. 13/910,563, filed Jun. 5, 2013, mailed Jul. 28, 2014.

Non-final Office Action for U.S. Appl. No. 13/910,563, filed Jun. 5, 2013, mailed Jul. 28, 2014.

Notice of Allowance and Fee(s) Due for U.S. Appl. No. 13/910,563, filed Jun. 5, 2013, mailed Dec. 3, 2014.

* cited by examiner

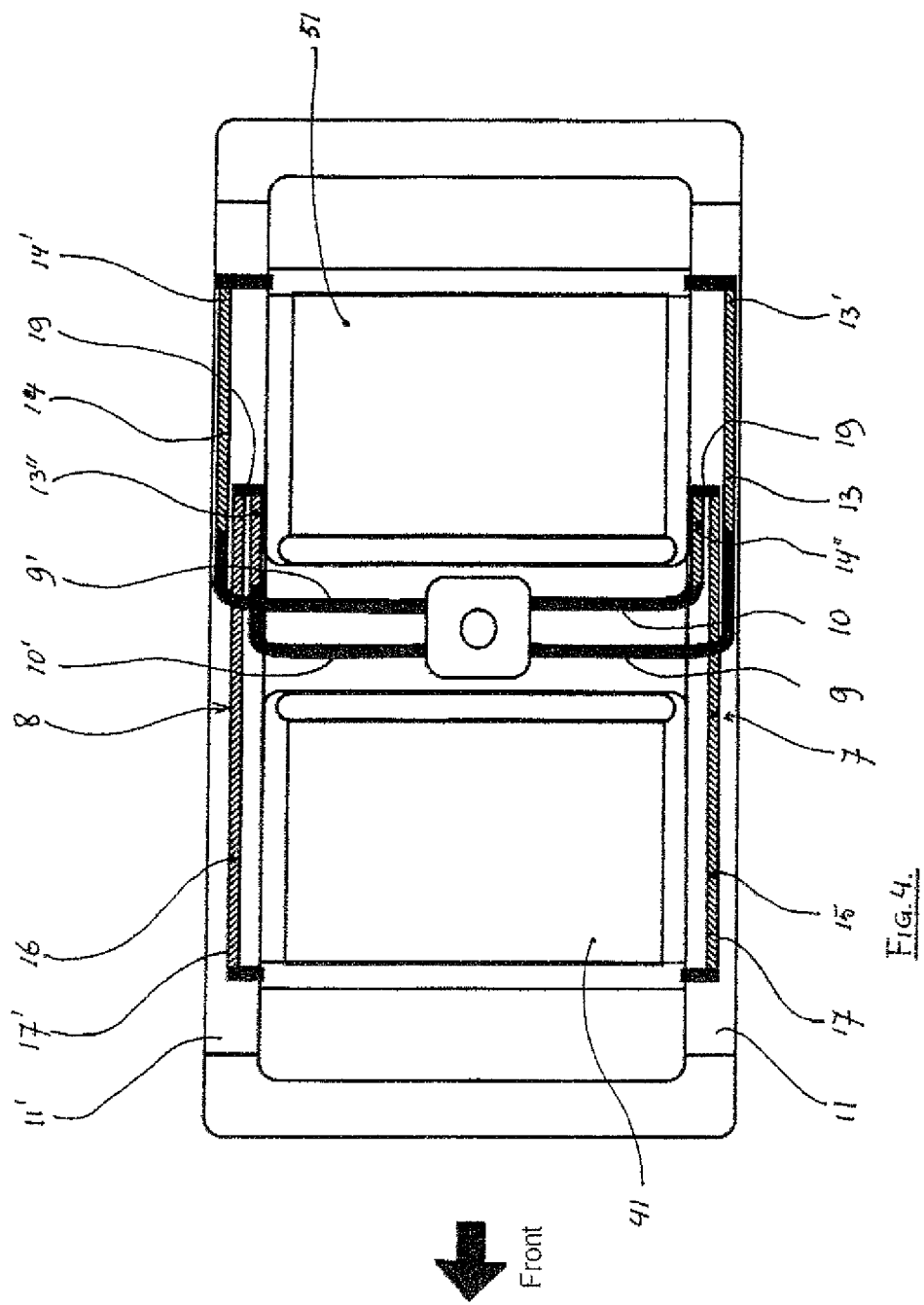

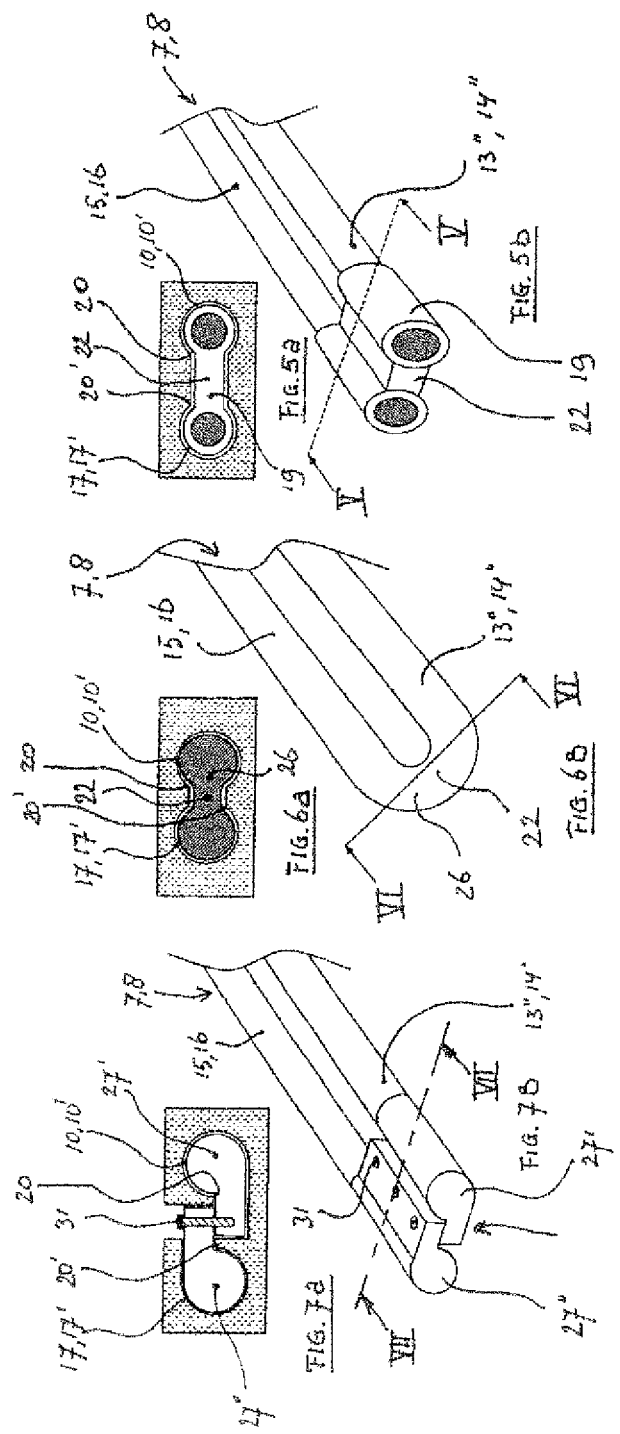

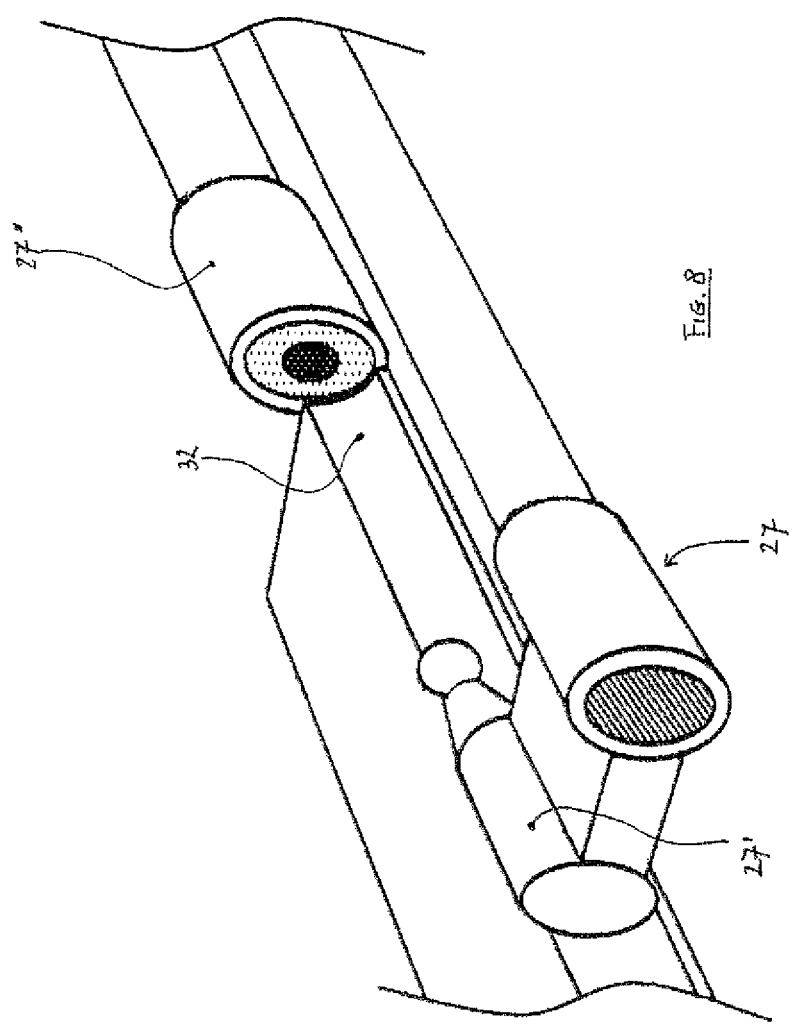

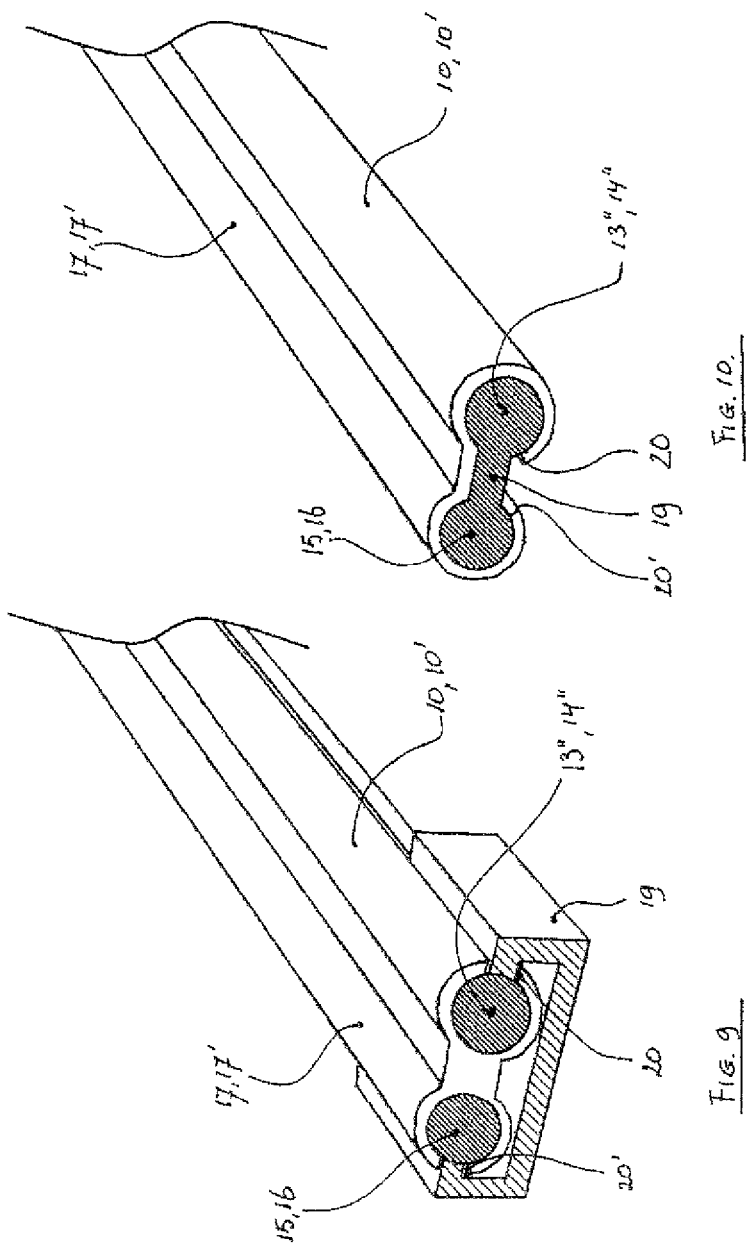

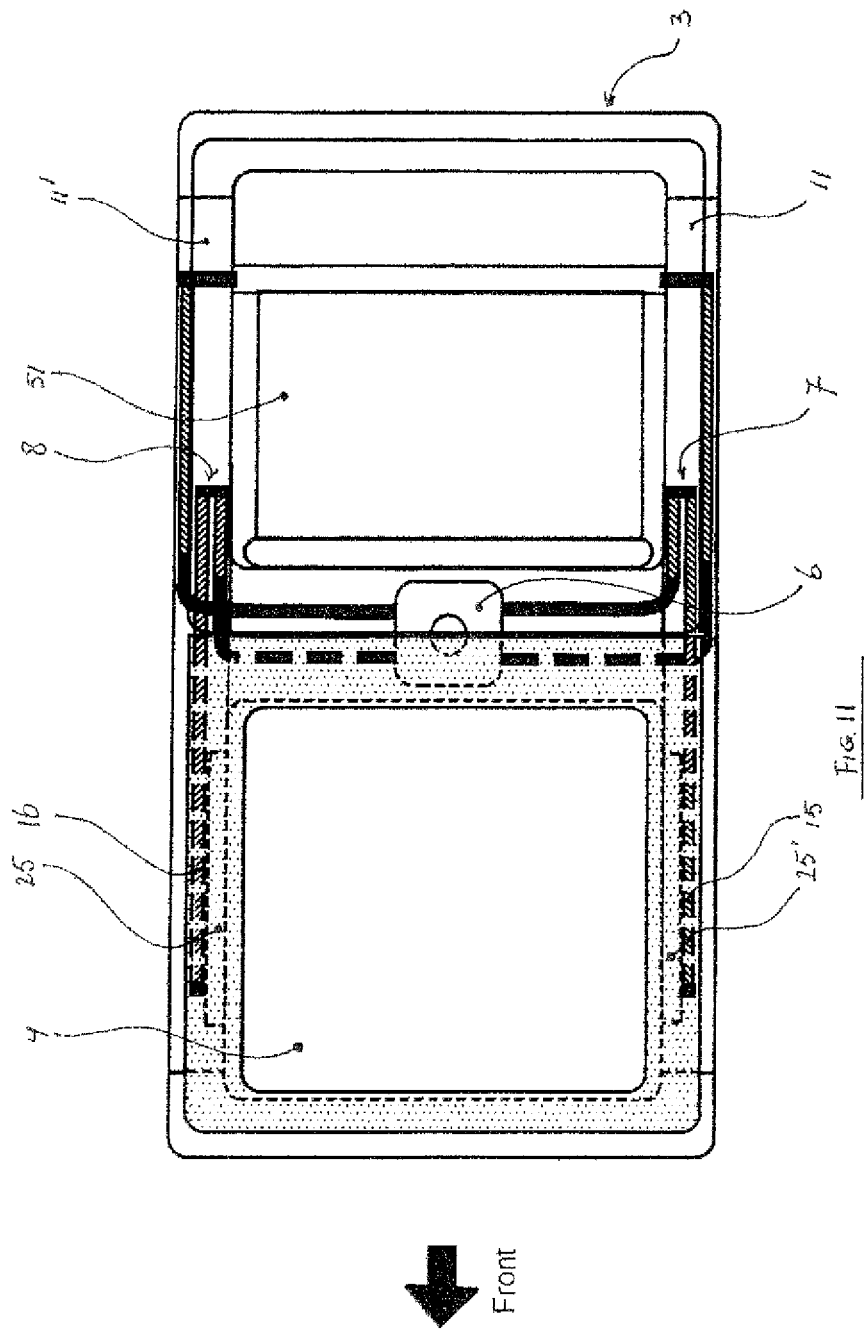

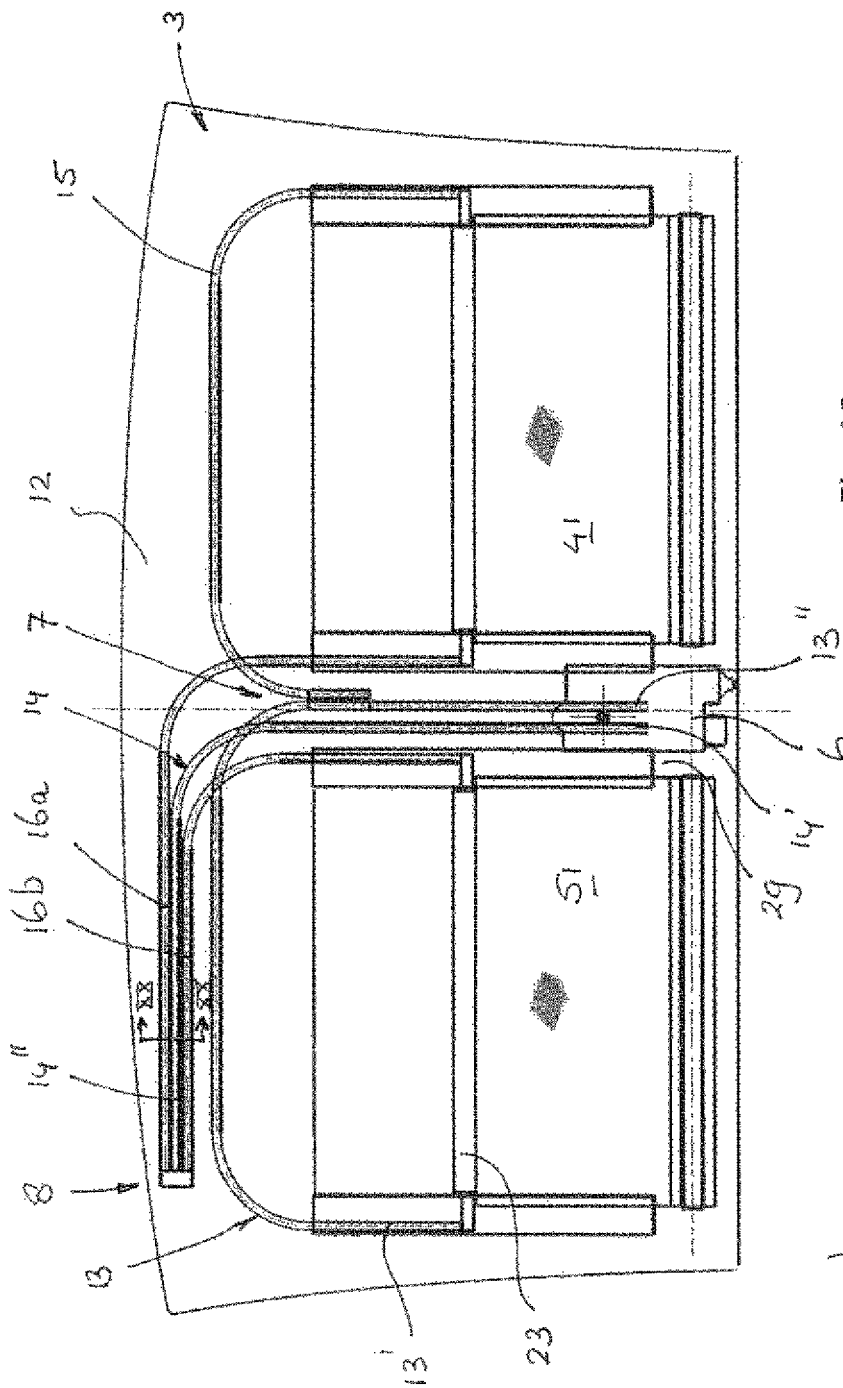
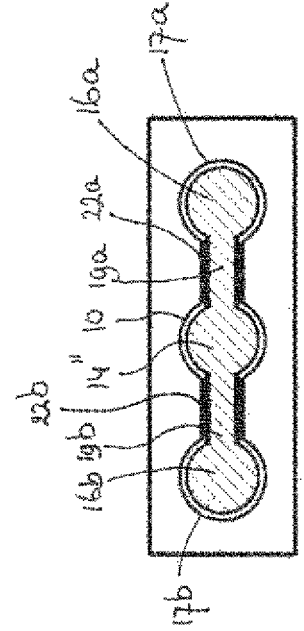
Fig. 19
Fig. 20

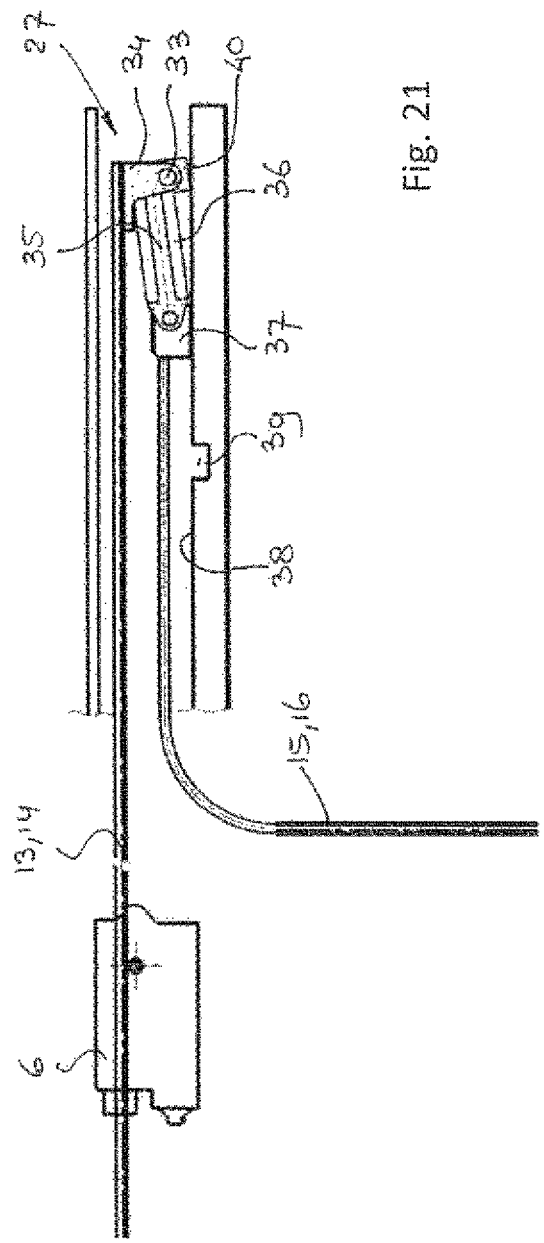
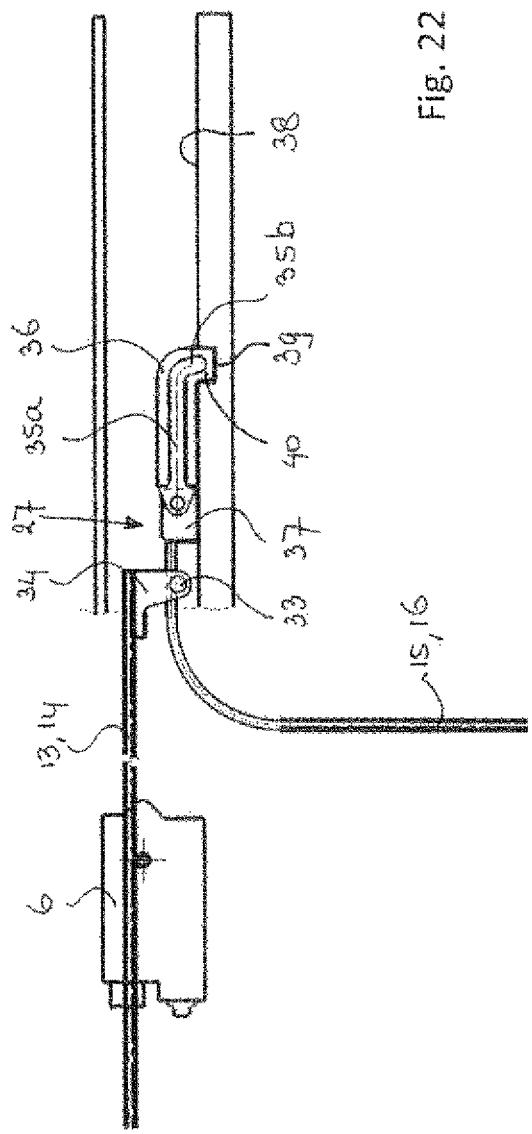
Fig. 21
Fig. 22

OPEN ROOF SYSTEM FOR A VEHICLE

BACKGROUND

The discussion below is merely provided for general background information and is not intended to be used as an aid in determining the scope of the claimed subject matter.

Aspects of the invention relate to an open roof system for a vehicle having an opening in its fixed roof, comprising a stationary part to be fixed to the roof, at least first and second movable elements, which are each movable between a position in which it is retracted, and a position in which it is deployed, a motor for driving the movable elements at least partly between the two positions, and at least two drive cable assemblies for transferring the torque of the motor to said movable elements, whereby the stationary part comprises at least first and second guiding channels and laterally positioned guides for respectively guiding the drive cable assemblies and the movable elements whereby the drive cable assemblies comprise a flexible first part having first and second ends, said first part being driven by the motor, and whereby said first end of said flexible first part is connected to the first movable element, in a first direction, and said second end is guided in a first guiding channel in the lateral guide, said second end oriented in a direction substantially parallel to the first end towards said first movable element.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention is an open roof system in which the drive cable assembly further comprises an elongated second part, guided in a second guiding channel in a second direction towards said second movable element and connected thereto, and in that the second guiding channel is oriented substantially parallel to the first guiding channel in the lateral guide, and in that, during at least part of the operation, said elongated second part moves substantially in the same direction as the second end of the first part of the cable assembly.

By having an elongated second part connected to the first part of the drive cable assembly it becomes possible to use the movement of the first part of the drive cable assembly to drive an elongate second part in a side-by-side fashion This opens up a lot of possibilities to obtain a favorable cable arrangement with the flexible first and elongated second parts to move the first and second movable parts. This might be favorable in view of the length of the drive cable, not only because of costs and necessary room, but also to reduce cable resistance, and cable slack, for example.

In one embodiment the elongated second part of the drive cable assembly is separate from the first part of the drive cable assembly. In such embodiment the first and second parts may be connected by a separate connecting part.

In this embodiment the second part may be continuously immovably connected to the flexible first part.

In another embodiment such a separate connection between the first and second parts could be temporary, for instance when the second part is temporarily connected to the flexible first part, by a temporary connecting part. This is necessary when the first and second movable elements do not require the same amount of cable movement for their respective function, so that during a movement between two positions of the first or the second movable element, the second elongated part is disconnected from the flexible first part, such that the second movable element, which requires the least of the cable travel, stops moving.

In another embodiment the elongated second part of the drive cable assembly is an extension of the flexible first part. This is when one and the same drive cable forms the first and the second part of the drive cable assembly. In such situation the elongated second part is delimited from the first part by a bend with a small radius in the drive cable assembly. In practice the boundary area between the first and the second part of the drive cable assembly shall be slightly flattened, due to the bend in the cable. This flattened area is necessary to let it protrude through a lateral opening in the guiding channels through which the first and second part of the drive cable assembly run. In this above described embodiment it is clear that the second part is continuously immovably connected to the flexible first part.

In another embodiment the elongated second part is a flexible part having the same properties as the flexible first part.

However, in yet another embodiment the elongated second part may have different properties compared to the flexible first part for instance the second part may be a substantially stiff part, made of plastic material or metal alloy, or the like.

In one embodiment the first and second guiding channels have lateral openings extending along the length of the guiding channels whereby the lateral openings are facing each other, and wherein the connecting part projects through said openings. It could be conceived in another embodiment that either one of the first, and second part projects through said openings. In another embodiment it could also be conceived that a part of the temporary connection projects through said openings.

In another embodiment the first and second guiding channels have lateral openings extending along the length of the guiding channels, whereby the lateral openings are facing away from each other, and wherein the connecting part projects through said openings.

In a preferred embodiment the first and second movable elements are windable sunscreens, and wherein the motor is positioned substantially between the first and the second movable elements.

It is also conceivable that the first and second movable elements are stackable sunscreens, or a closure assembly for closing of the opening in the fixed roof of the panel.

In another embodiment, the first and second movable elements are the closure assembly and one or more slides. For instance slides for raising a wind deflector assembly for deflecting the wind when the closure assembly is in the open position.

In yet another embodiment the elongated second part is part of a mechanism for the movement of the first or second movable element.

BRIEF DESCRIPTION OF THE DRAWINGS

Aspects of the invention will hereafter be elucidated with reference to the drawings showing embodiments of the invention by way of example.

FIG. 4 is a plan view of the open roof system according to FIG. 3, whereby the closure assembly of the open roof system is not shown for clarity reasons.

FIG. 5b is a schematic perspective view through the connecting part in one embodiment, which is part of the drive cable assembly.

FIG. 5a is a cross section taken along line V-V in FIG. 5b through the connecting part, and showing guiding channels with lateral openings facing each other.

FIG. 6a is a cross section taken along line VI-VI in FIG. 6b through the connecting part, and showing guiding channels with lateral openings facing each other.

FIG. 6b is a schematic perspective view showing the drive cable assembly, whereby the first and the second part of the assembly is a continuous cable having an acute angle.

FIG. 7a is a cross section taken in FIG. 5B along line VII-VII through the connecting part.

FIG. 7b is a schematic perspective view, showing the connecting part in an embodiment, in which it is built up of two mirror image pieces.

FIG. 8 is an enlarged schematic perspective view of the temporary connecting part, shown in a disconnected position.

FIG. 9 is a schematic perspective view, starting from a perspective cross section at the front of the drawing, showing two guiding channels, having lateral openings facing away from each other.

FIG. 10 is a schematic perspective view showing guiding channels having joined lateral openings facing a downward direction.

FIG. 11 is a schematic plan view of the open roof system showing, front and rear glass panels, of which only the rear panel is drawn as being transparent, in order to show the windable or rollo screen, guiding channels and drive cable assemblies, lying below the transparent rear panel.

FIGS. 16-19 are schematic plan views of further embodiments of the open roof system having two windable sunscreens positioned side-by-side.

FIG. 20 is an enlarged cross-section according to the line XX-XX in FIG. 19.

FIG. 21, 22 are enlarged plan views of a temporary connection between first and second parts of a drive cable assembly, in two positions.

DETAILED DESCRIPTION OF THE ILLUSTRATIVE EMBODIMENTS

Figure 1:
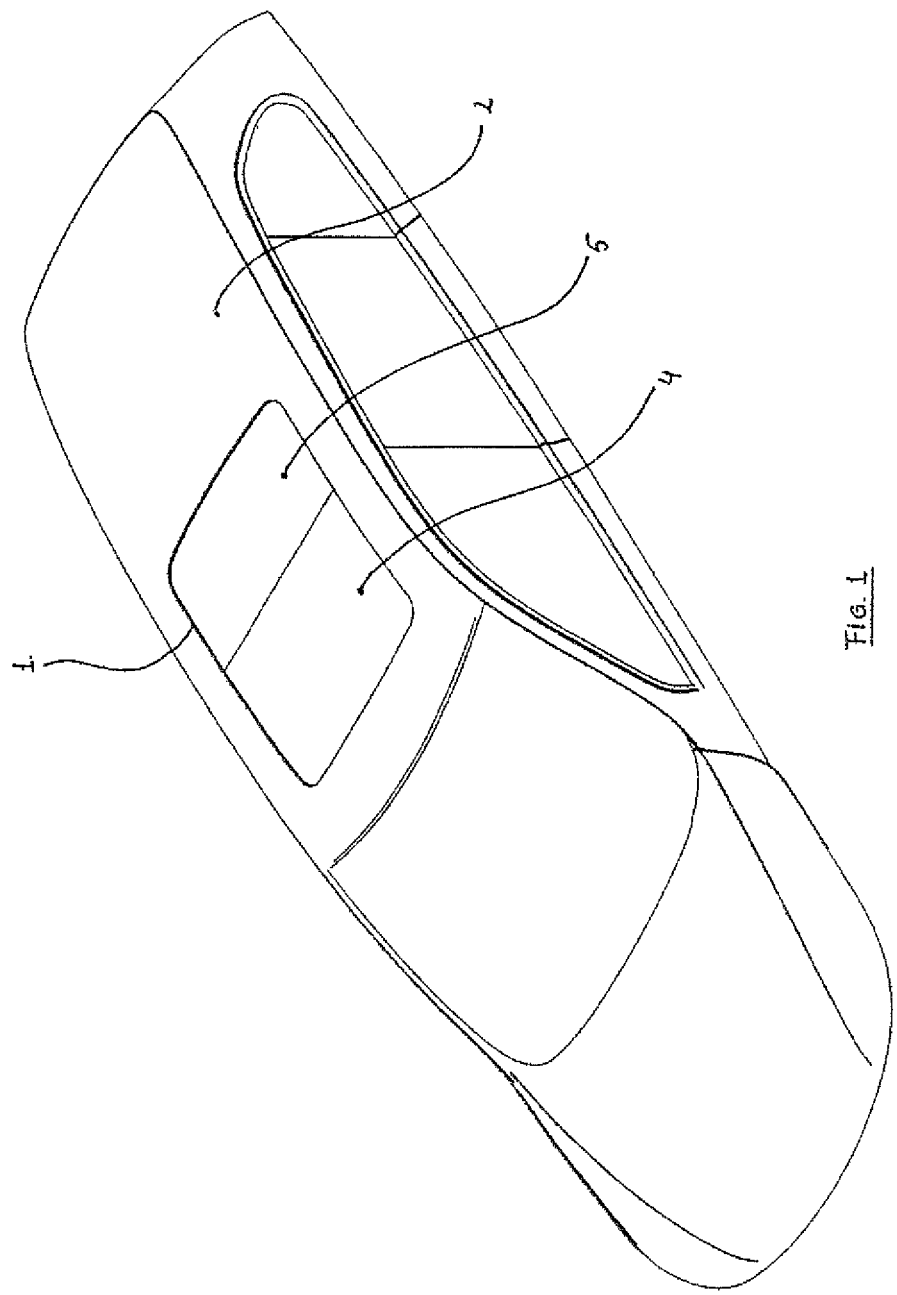
FIG. 1 is a schematic perspective view of a passenger car which is provided with an embodiment of the open roof system.

Referring to FIG. 1, a vehicle having an open roof system in its fixed roof 2 is illustrated schematically. Said open roof system comprises a roof opening 1 in a fixed roof 2 of the vehicle, such as a passenger car, and at least first and second closure elements 4, 5 for example glass or plastic, at least partly transparent panels as shown in FIG. 1. The first and second closure elements can be moved for closing and at least partially opening said roof opening 1 by means explained below.

Below the roof opening 1, not shown in FIG. 1, but elucidated hereafter, at least first and second movable elements 41, 51, 42, 52, 24 are arranged, here in the form of windable (flexible) sunscreens or rollo's, stackable (rigid) sunscreens or slides for a wind deflector, which are each movable between a position in which it is retracted, and a position in which it is deployed. Other first and second movable elements are conceivable.

Figure 2:
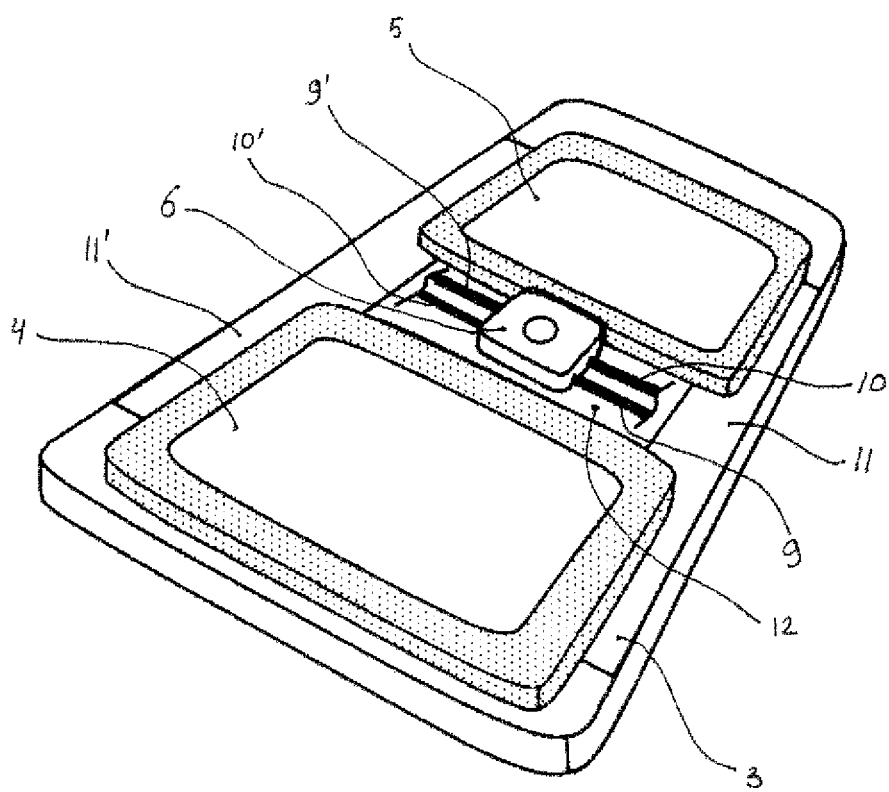
FIG. 2 is an enlarged schematic perspective view of the open roof system used in the car of FIG. 1.

Referring to FIG. 2, an open roof system is schematically illustrated, comprising the first and second movable elements 4, 5, here a closure assembly, connected via a moving mechanism (not shown here), which is known per se, to a stationary part 3, particularly a frame, and further comprising a motor 6 and partly shown first guiding channels 9, 9', 10, 10'. The stationary part 3 comprises front and rear members and a center member 12, which are known per se, and not further elucidated and are connected to lateral extrusion guides 11, 11', and said stationary part 3 connects the open roof system with the body of the vehicle by means of the usual fixing concepts such as screwing, gluing or a combination of these fixing concepts. The motor 6 may be an electric motor with a gearwheel that transfers the motor torque to the movable elements 4, 5, 24, 41, 51, 42, 52, via the drive cable assemblies 7, 8, in a way known per se. In FIG. 2 the motor 6 is positioned on the center member 12, but it is conceivable that the motor 6 is positioned on the front or rear member of stationary part 3.

Figure 3:
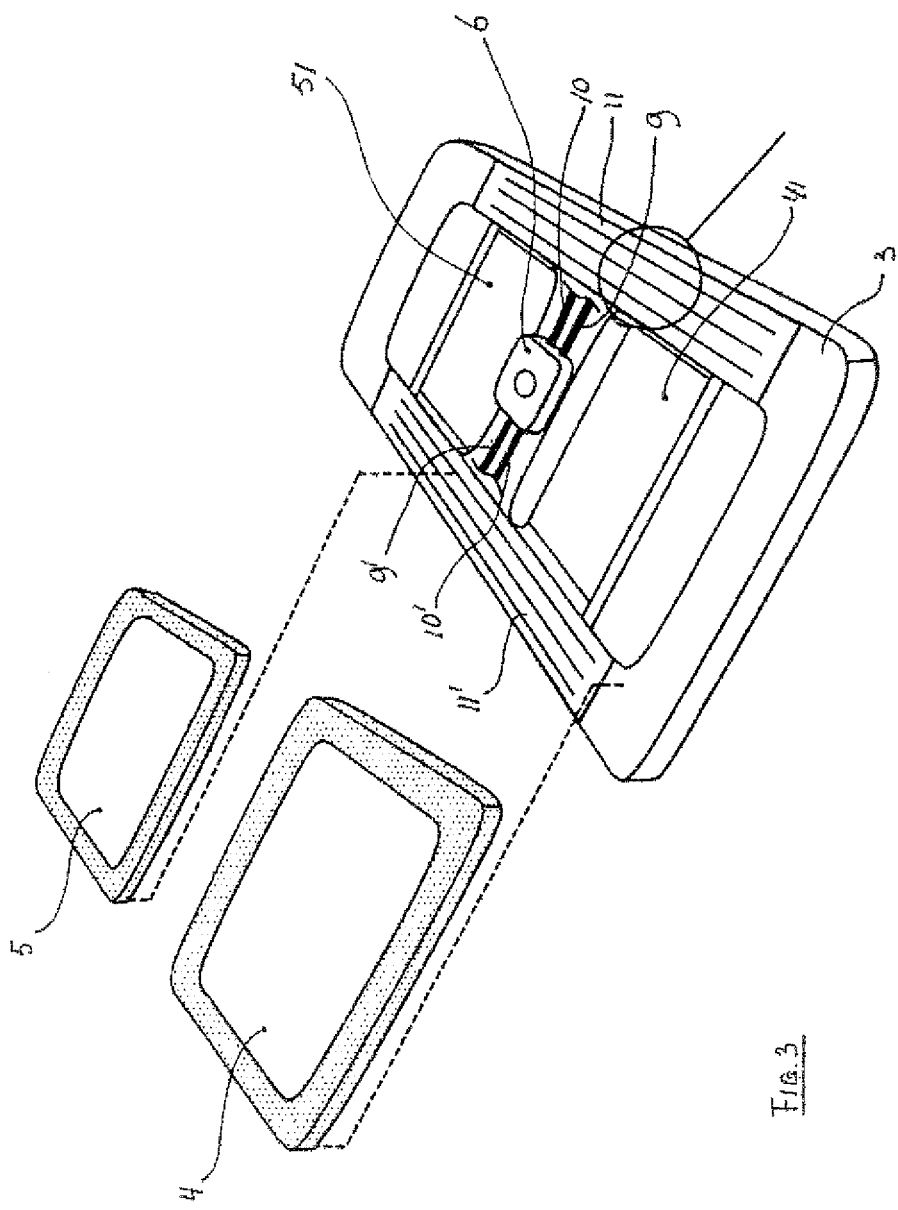
FIG. 3 is a schematic perspective exploded view of the open roof system of FIG. 2.

Referring to FIG. 3, an open roof system is illustrated schematically and partly in exploded view, such that the stationary part 3 and the first and second movable elements 41, 51, here windable sunscreens, are shown. The first and second movable elements 41, 51 are drawn in a partly deployed position. Each of these windable sunscreens comprise a flexible screen, said screen being connected on one longitudinal end to a winding shaft, and on its opposite longitudinal end to a movable operating beam 23. Said screen can be wound up onto, or unwound from the rotatable winding shaft in order to respectively deploy or retract the sunscreen. The winding shafts of each of said movable elements 41, 51 are fixed to the stationary part 3, and are positioned, seen in a longitudinal direction, adjacent to the motor 6. Said motor 6 is positioned on the center member 12 of stationary part 3, such that each of the movable elements 41, 51 can be deployed and or retracted in an opposite longitudinal direction.

The stationary part 3 comprises lateral extrusion guides 11, 11'. Said lateral guides 11, 11' comprise supporting channels for guiding the first and second movable elements 4, 5, 41, 51, 42, 52, 24, but said guides comprise also first and second guiding channels 9, 9', 10, 10', 17, 17' for guiding first and second drive cable assemblies 7, 8, and movable elements 4, 5, 24, 41, 51, 42, 52, said first and second guiding channels are oriented substantially parallel to each other along at least a part of their length.

FIG. 4 shows only part of the open roof system, namely the stationary part 3, the first and second moveable members 41, 51, drawn in a partly deployed position, the motor 6, first and second guiding channels 9, 9', 10, 10', 17, 17, and schematically, shown by hatching in the drawing, part of the drive cable assemblies 7, 8, running in guiding channels 9, 9', 10, 10', 17, 17'. The first guiding channels 9, 9', 10, 10' guide the drive cable assemblies 7, 8 to and from the motor 6, said channels can be conceived as being steel pipes or channels incorporated in either of the front, center or rear members in a manner known per se, running from the motor to a connecting joint with the first channel, in the lateral guide 11, 11'.

The first and second drive cable assembly 7, 8 comprise flexible first parts 13, 14, having first ends 13', 14', and second ends 13", 14", and further second parts 15, 16 and a connecting part 19.

Each of the first parts 13, 14 of the drive cable assemblies is guided in the first guiding channels 9, 9'. Said first parts 13, 14 run from the position at which the gearwheel of the motor 6 is in driving engagement with the first part of the drive cable assembly 7, 8 in one direction through the first guiding channels 9, 9'. Via a connection joint they run from the first channels 9, 9' into the respective lateral guide, and along a lateral guiding channel, up to where the first parts 13, 14 are connected with their first end portions 13', 14' to the connecting part 19 of the first or second movable element 41, 51.

Each of the first parts 13, 14 runs in opposite direction from the end of the first end portion 13', 14', from the position at which the gearwheel of the motor 6 is in engagement with the drive cable assembly, through the first guiding channels 10, 10'. Via a connection joint they run from the channels 10, 10' into the respective lateral guide, and along a lateral guiding channel, up to where the first parts 13, 14 are connected with their second end portions 13", 14" to the connecting part 19.

The second parts 15, 16 of drive cable assembly 7, 8 are connected to the first parts 13, 14 by means of the connecting part 19, and said second parts 15, 16 run in second guiding channels 17, 17' in lateral guides 11, 11' from said connecting part 19 to a connecting part of the first or second movable element at an opposite end. Second parts 15, 16 may be a substantially stiff part, for example made of plastic material or a metal alloy.

When in FIG. 4 the motor 6 runs in clockwise direction, first and second movable elements 41, 51 will be retracted, that is the windable sunscreen cloth will be wound up onto the respective winding shafts. This can be explained as follows. First parts 13, 14 of drive cable assemblies 7, 8, which are connected with their first end portios 13', 14' to the movable operating beam 23 of the second moveable element 51, are driven by the clockwise turning motor in a direction such that the movable beam slides towards the winding shaft of movable element 51, and thus retracting the movable element 51.

Because the end of second end portions 13", 14" are positioned at the opposite end of first parts 13, 14, and also at the opposite side of motor 6, this end will move in longitudinally opposite, but substantially parallel direction compared to its first end portions 13', 14', and towards the first movable element 4, 24, 41, 42.

Second parts 15, 16 of drive cable assembly 7, 8 are connected to the second end portions 13", 14" of first parts 13, 14, so that second parts move in the same direction as said second end portions 13", 14", and said second parts 15, 16 are guided in a second guiding channel 17, 17 in a second direction towards the second movable element 5, 51, 52, and connected thereto. Thus, said second parts will move in a longitudinal direction opposite to the first parts when motor 6 runs in a clockwise direction. The movable operating beam 23 slides towards the winding shaft of movable element 41, and thus retracting the movable element 41 toward its open position. So by connecting the first parts 13, 14 to the second parts 15, 16 drive cable assemblies 7, 8 are created with which the two movable elements 41, 51 are driven by means of one motor.

Referring to FIGS. 5a and 5b, the elongated second part 15, 16 of the drive cable assembly 7, 8 is separate from the first part 13, 14, and the connecting part 19 of the first and second drive cable assemblies 7, 8 is illustrated in a schematic way, as a separate part. First and second guiding channels 9, 9', 10, 10' have lateral openings 20, 20' along the length of the guide, which openings allow the connecting part 19 to protrude from the first into the second guiding channel. Second end portions 13", 14" of first parts 13, 14 of drive cable assemblies 7, 8 are firmly and immovably connected to second parts 15, 16 by means of this connecting part 19. Said connecting part 19 could for instance be made of a plastic molded part, or a metallic molded or casted part. The shape of the connecting part 19 is such that it has a narrow portion 22 in between the drive cable first and second parts 13, 14, 15, 16. This narrow portion 22 is necessary to make the lateral openings 20, 20' small enough, so that when a driving force is applied to said drive cable assemblies 7, 8, the drive cables do not escape from their respective channels through the respective lateral openings 20, 20', at an area away from the connecting part 19. In this embodiment the lateral openings 20, 20' in the first and second guiding channels are facing each other. The length of the openings 20 is such that they allow movement of the connecting part 19 over a distance sufficient to allow movement of the movable elements 41, 51 between their retracted and deployed positions.

Referring to FIGS. 6a and 6b, another embodiment of the drive cable assemblies is schematically shown. In this embodiment the first and second drive cable assemblies may each also be made of just one cable, whereby the elongated second part is an extension of the flexible first part. Instead of a separate connecting part 19 connecting two separate drive cables, the first and second drive cable parts 13, 14, 15, 16 could be made of one piece of cable having a bend 26 with a small radius (here through 180 degrees) at the position where the cable is routed from the first guiding channel 9, 10, to the second guiding channel 17, 17'. At this particular bend 26, the transition of the cable thickness must have a similar narrow portion 22, which protrudes through lateral openings 20, 20', such that the drive cable cannot escape through lateral openings 20, 20' in the first and second guiding channels 9, 9', 10, 10', 17, 17', and said channels can give enough support for guiding the cable assemblies 7, 8 as explained above. In this embodiment the elongated second part 15, 16 may be a flexible part having the same properties as the flexible first part. The lateral openings 20, 20' are facing each other.

FIGS. 7a and 7b refer to yet another embodiment of connecting first and second parts 13, 14, 15, 16 of the first and second drive cable assemblies 7, 8. Here the connecting part 19 is split up in two parts, each of which are connected with a separate element, which could be a screw or equivalent. Such embodiment could be used in a situation where the complete drive cable assembly is difficult to assemble into first and second guiding channels. In this embodiment the first and second part of the cable can be assembled in sequence, and afterwards these two parts can be connected to each other by means of the separate fixing element 31.

FIG. 8 is referring to another special embodiment of the connecting part 19. As explained before, the first and second movable elements are driven by one motor 6. It is clear that when the length of movement of the part of the drive cable assemblies that drives the first movable element 4, 41, 42 or 24 from a first extreme position to another extreme position is not the same as the length of movement required for the second movable element 5, 51 or 52, it is not possible to finalize the movement of one of the movable elements, when the movement of the other element is completed. To overcome this problem, a temporary connection 27 is proposed. Said part comprises a first part 27' fixed to the second end portion 13", 14" having a protruding counterpart which can make a temporary connection with a second part 27", and the second part 27" which is connected to the second part 15, 16 of the drive cable assembly 7, 8 further comprising a receiving part for receiving the protruding counterpart temporarily. The second part 27" can be coupled and decoupled from the first part 27'. When the first and second parts 27', 27" are coupled, the temporary connection 27 can transfer the driving forces supplied by the motor 6. The coupling between first and second part is in this case a clamping coupling. The first part 27' and second part 27" are decoupled by allowing the second part 27" to be stopped from moving by a protruding part 32 adopted in the second guiding channel 17, 17' and thus that second movable element 5, 51, 52 stops moving. Protruding part 32 not only stops second part 27", but also locks it, at the same place, relative to the second guiding channel 17, 17'. Once first and second part 27', 27" are decoupled, it is necessary to lock second part 27" in place, in order to be able to couple said first and second part again. The first part 27' of the temporary connection 27 will be moved further under influence of the motor force, and will be decoupled from the second part 27" of the temporary connection 27. First part 27' is capable of transferring push and pull forces, this is possible due to the fact that the coupling and decoupling force between first part 27' and second part 27" is higher than the normal force required for moving either of the moving elements 4, 5, 24, 41, 42, 51, 52. The coupling and decoupling force, to couple and decouple the first and second part from each other, lies within the maximum force the motor 6 can exert. For connecting the first and second part of the temporary connection 27 the procedure is done in a reverse manner. It will be clear that with this temporary connection 27 as part of the drive cable assemblies 7, 8 it will be possible to drive both movable elements 4, 5, 41, 51, 42, 52 from one extreme position to another extreme position, still using one motor FIGS. 9 and 10 refer to alternative embodiments of lateral openings 20, 20' in the first and second guiding channel 9, 9', 10, 10', 17, 17'. In FIG. 9 it is shown that the lateral openings 20, 20' in first and second guiding channels 9, 9', 10, 10', 17, 17' are facing away from each other, such that the connecting part 19, forms a bridge shape, connecting the first and second part 13, 14, 15, 16 of the drive cable assembly. Also it can be conceived that in FIG. 10 the lateral openings 20, 20' in the first and second guiding channel 9, 9', 10, 10', 17, 17' is a joint opening facing in another direction, for instance in a downward direction or upward direction.

Figure 14:
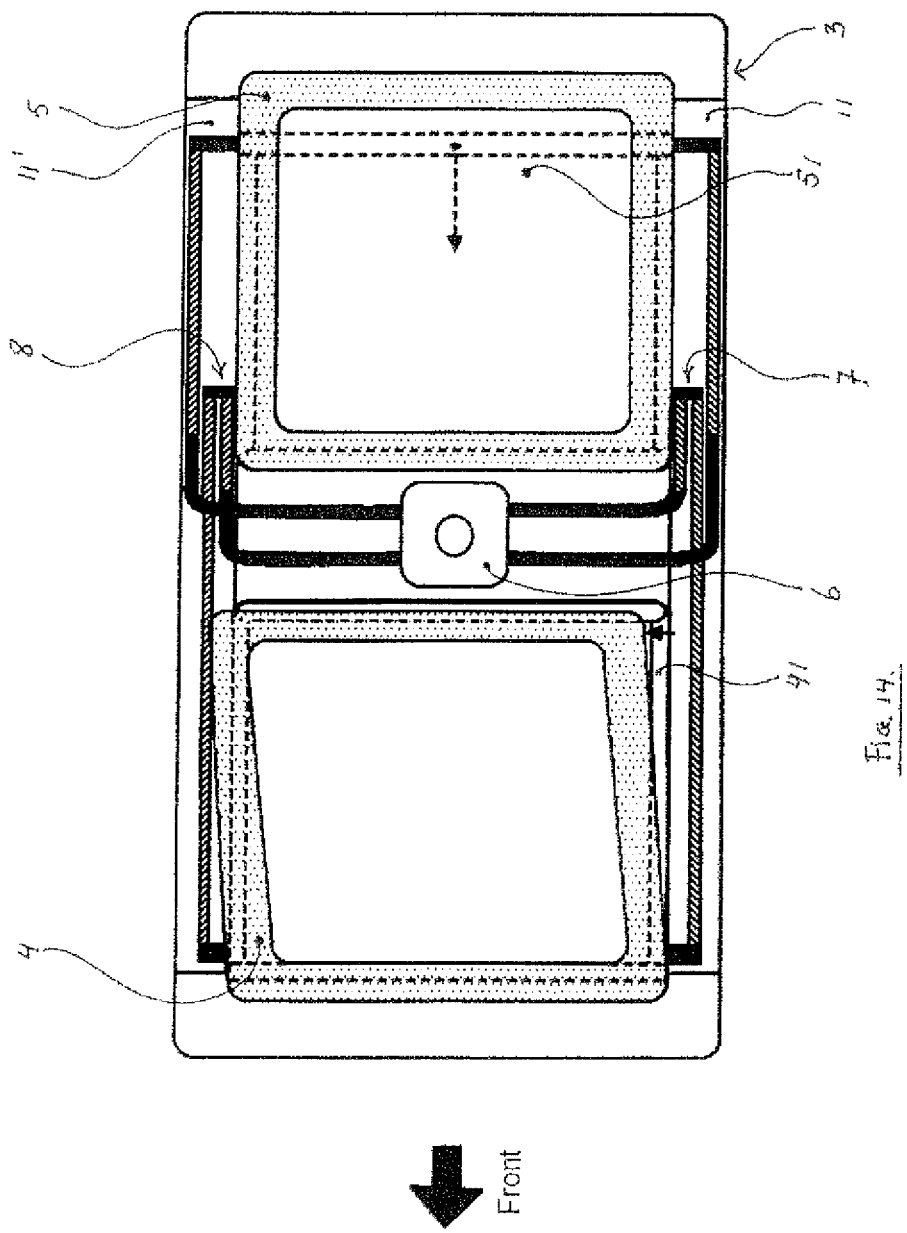
FIG. 14 is a schematic plan view of the open roof system showing the front and rear closure panels, and the front and rear windable screens. The front panel is drawn in a tilted position and the rear windable screen is drawn in a partly open position.

In the embodiment of FIGS. 11 and 14 the first movable element 4 is a closure means, in particular a panel, and the second movable element 51 is a windable sunscreen. In FIG. 11, the closure means 4 is driven by a moving mechanism 25, 25' which, when the closure means moves to another position, slides in guiding channels in the guide 11, 11'. Such a closure means and mechanism are known per se. In FIG. 11 the mechanism 25, 25' is connected to the second part 15, 16 of the drive cable assembly 7, 8. The advantage of such connection is that the attachment point of the mechanism 25, 25' to the second part 15, 16, may slide, seen in a longitudinal direction, close to the rear of the opening, or even rear of the opening of the closure means 4, such that closure means 4 may slide more to the rear, which results in a larger opening.

Figure 12:
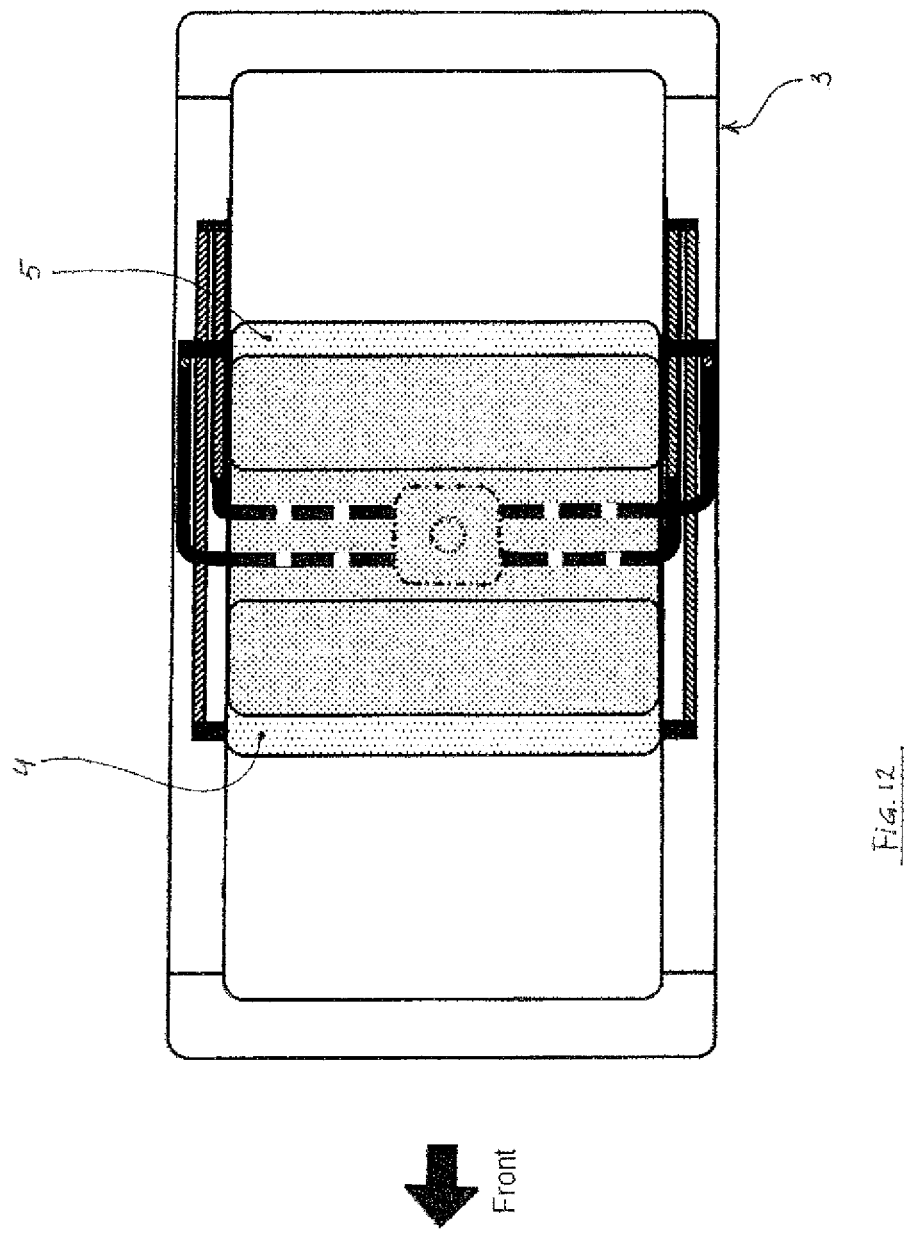
FIG. 12 is a schematic plan view of the open roof system, showing the front and rear glass panels in a centrally stacked position.

In FIG. 12 an open roof system is drawn in a schematic way, whereby the first and second movable elements 4, 5 are panels that are part of a closure assembly. The closure assembly closes the roof opening in the first, deployed position, and the panels 4, 5 thereof may slide towards each other, and may be stacked on top of each other, in a central area of the open roof system in a retracted position, as is shown in FIG. 12.

Figure 13:
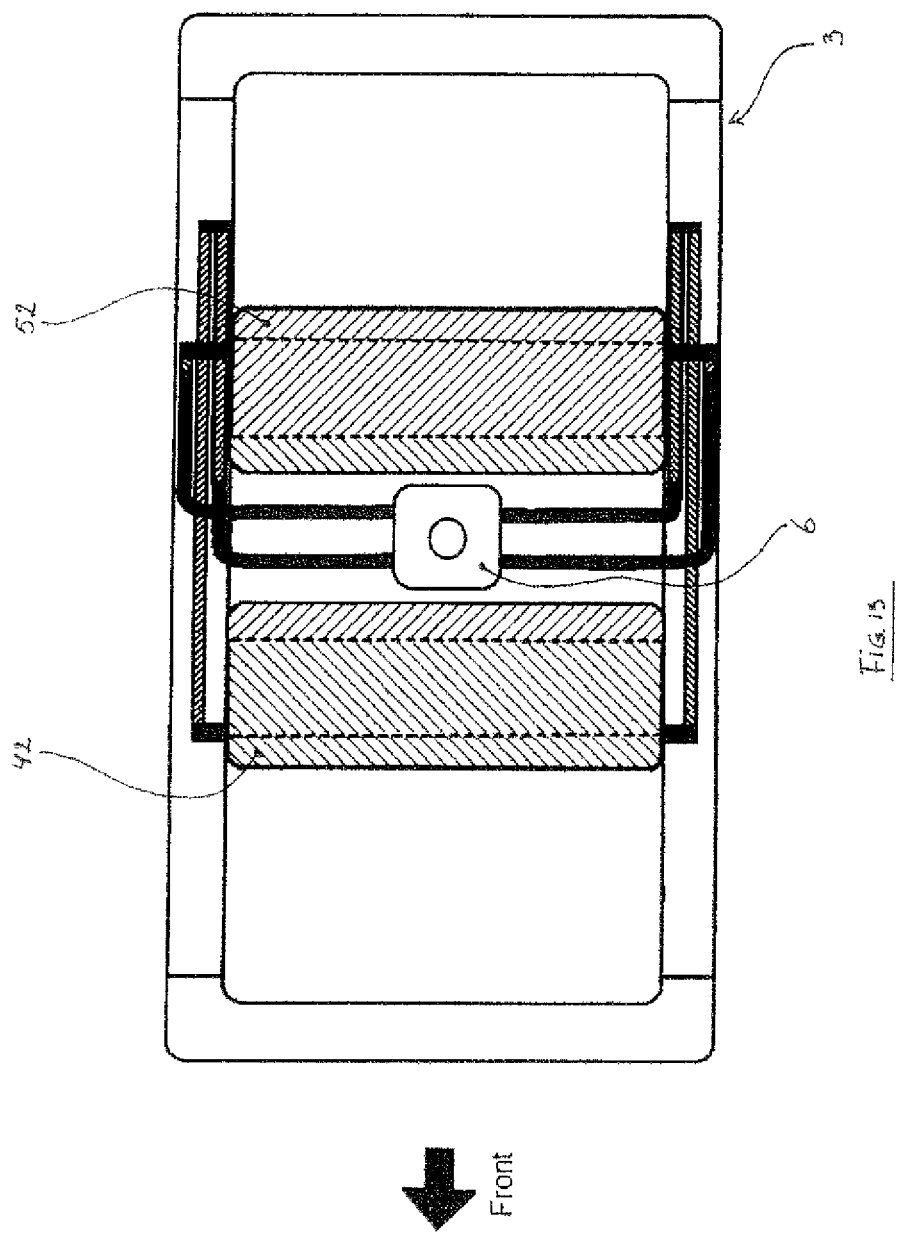
FIG. 13 is a schematic plan view of the open roof system, showing the front and rear sunshade panels in a centrally stacked position.

In FIG. 13 an open roof system is shown, in which the first and second movable elements 42, 52 are stackable sunshades. The stackable sunshades close the opening beneath the roof opening and the closure assembly in a first, deployed position, and may slide towards each other and be stacked or be adjacent to each other in a central area of the open roof system, in a retracted position, shown in FIG. 13.

Figure 15:
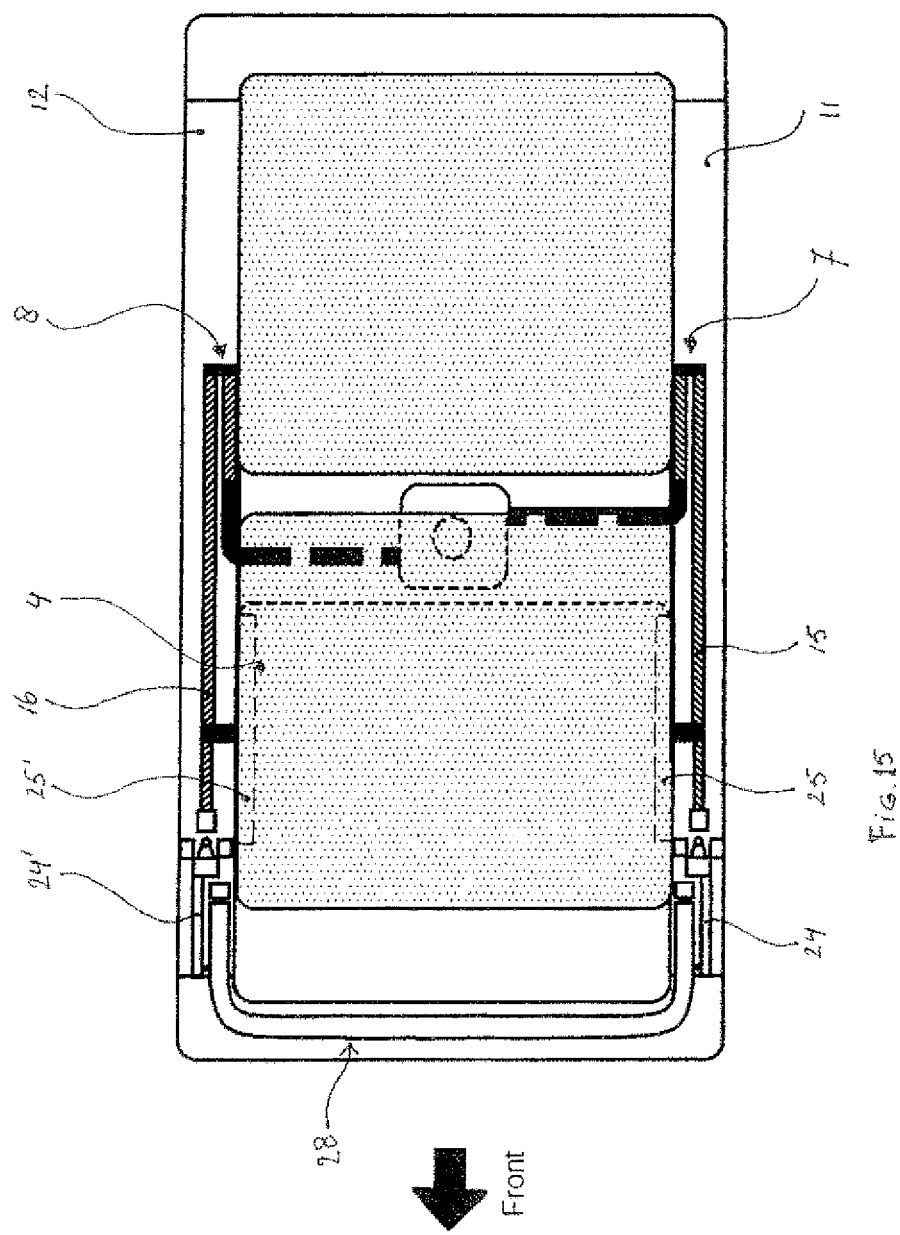
FIG. 15 is a schematic plan view of the open roof system showing the front and rear glass panels, and the wind deflector device having slides. The front panel is drawn in a slightly open position, whereas the drive cable assemblies are drawn in a disconnected position from the wind deflector slide.

Further, in FIG. 15 an open roof system is drawn in a schematic way, whereby the first movable element 4 is a closure element, and the second movable element is a slide assembly 24, 24' that moves a wind deflector means 28. In this embodiment the first and second movable elements 4, 24, 24' are connected both to the second part 15, 16 of the drive cable assembly 7, 8. Such a wind deflector 28 is known per se, it comprises a wind deflector body pivotally attached to the lateral guides 11, 12, and being capable of pivoting around a pivot point from a position, in which it is retracted below the closure element, to a position in which it is deployed above the roof opening. The wind defector body further comprises a laterally protruding pin, for the engagement with the wind deflector slide assembly 24, 24'. The wind deflector 28 further comprises said slide assembly 24, 24', which is slidably guided in the lateral guides 11, 12. Said slide assembly comprises a track for engagement with the pin on the wind deflector body. Moving the slide assembly 24, 24' backwards in the guiding channel by moving second part 15, 16 of drive cable assembly 7, 8, the wind deflector body moves from a retracted position to a deployed position, as drawn in FIG. 15. The element 4 is connected to a moving mechanism 25, 25' and known per se, as described before. Furthermore to allow the second part 15, 16 of the drive cable assembly 7, 8 to adjust the second movable part 24 and the first movable part 4 at the same time, a temporary connection 27 is provided. It temporarily connects the second part 15, 16 of drive cable assembly 7, 8 to the wind deflector slide 24, 24'. It will be decoupled from said wind deflector slide assembly 24, 24' when the wind deflector body is in its deployed position. This is necessary because the length of the cable travel to raise the wind deflector body in a deployed position, is shorter than the length of the cable travel necessary to open the closure means.

Figure 16:
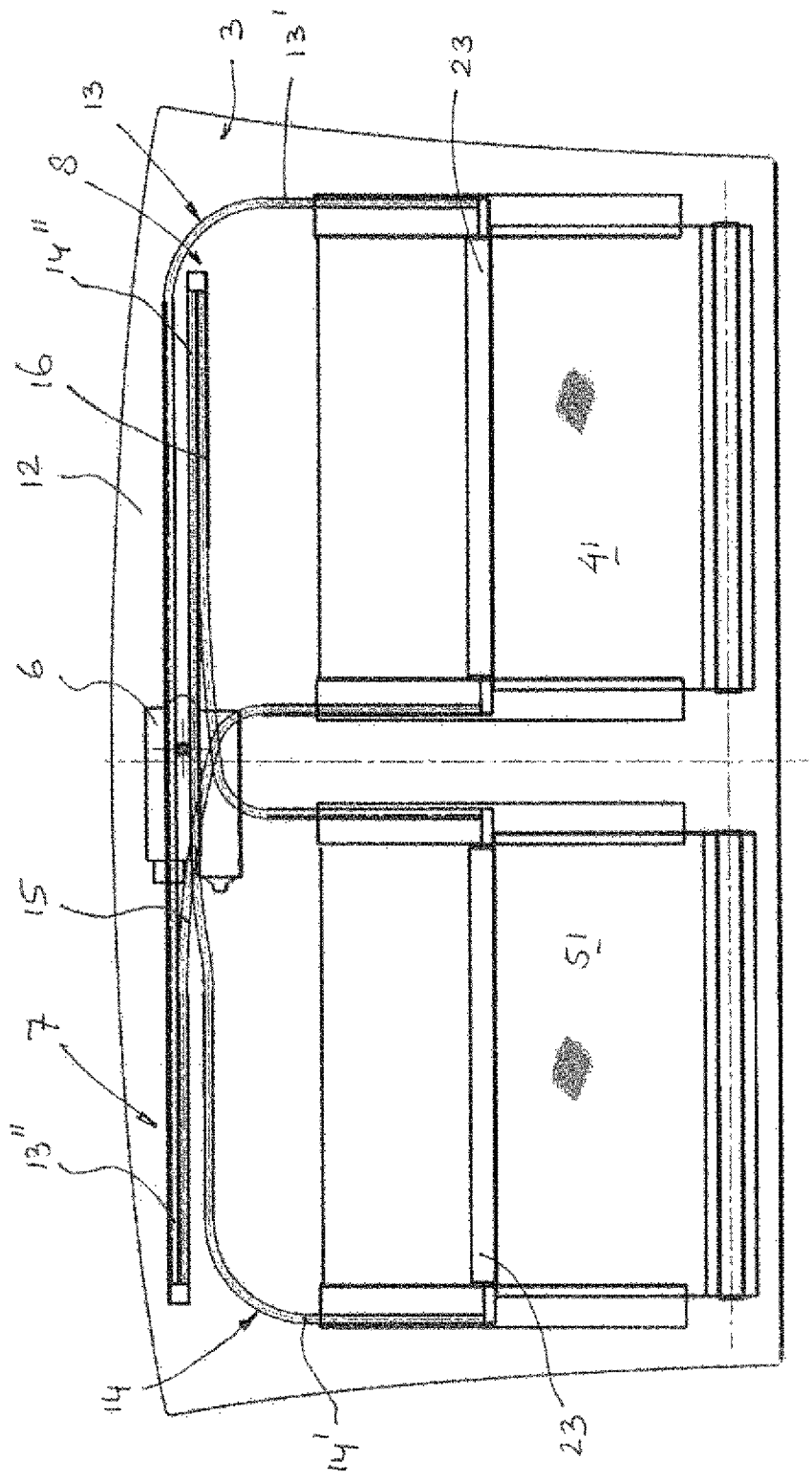

FIG. 16 shows another embodiment of the open roof system. In this embodiment each movable element in the form of windable sunshades 41, 51 is movable by means of the flexible first part 13, 14 and the elongated second part 15, 16 of the same drive cable assembly 7 or 8, respectively. This is particularly useful in this case where the two movable elements in the form of the sunshades 41, 51 are positioned side-by-side. The second end portions 13", 14" of the flexible first parts 13, 14 of both drive cable assemblies 7, 8 will then remain in a central transverse portion or beam 12 of the frame 3. The first end portion 13' of the flexible first part 13 of the first drive cable assembly 7 is connected to one of the ends of the operating beam 23 of the first windable sunscreen 41, and the elongated second part 15 of the first cable assembly 7 is connected to the opposite end of the operating beam 23 of this first windable sunscreen 41. The same is true for the second drive cable assembly 8, whose first end portion 14' of the flexible first part 14 is connected to the operating beam 23 of the second windable sunscreen 51 and the elongated second part 16 is connected to the opposite end of the operating beam 23 of the second windable sunscreen 51.

This embodiment is particularly favorable in view of tolerances.

Figure 17:
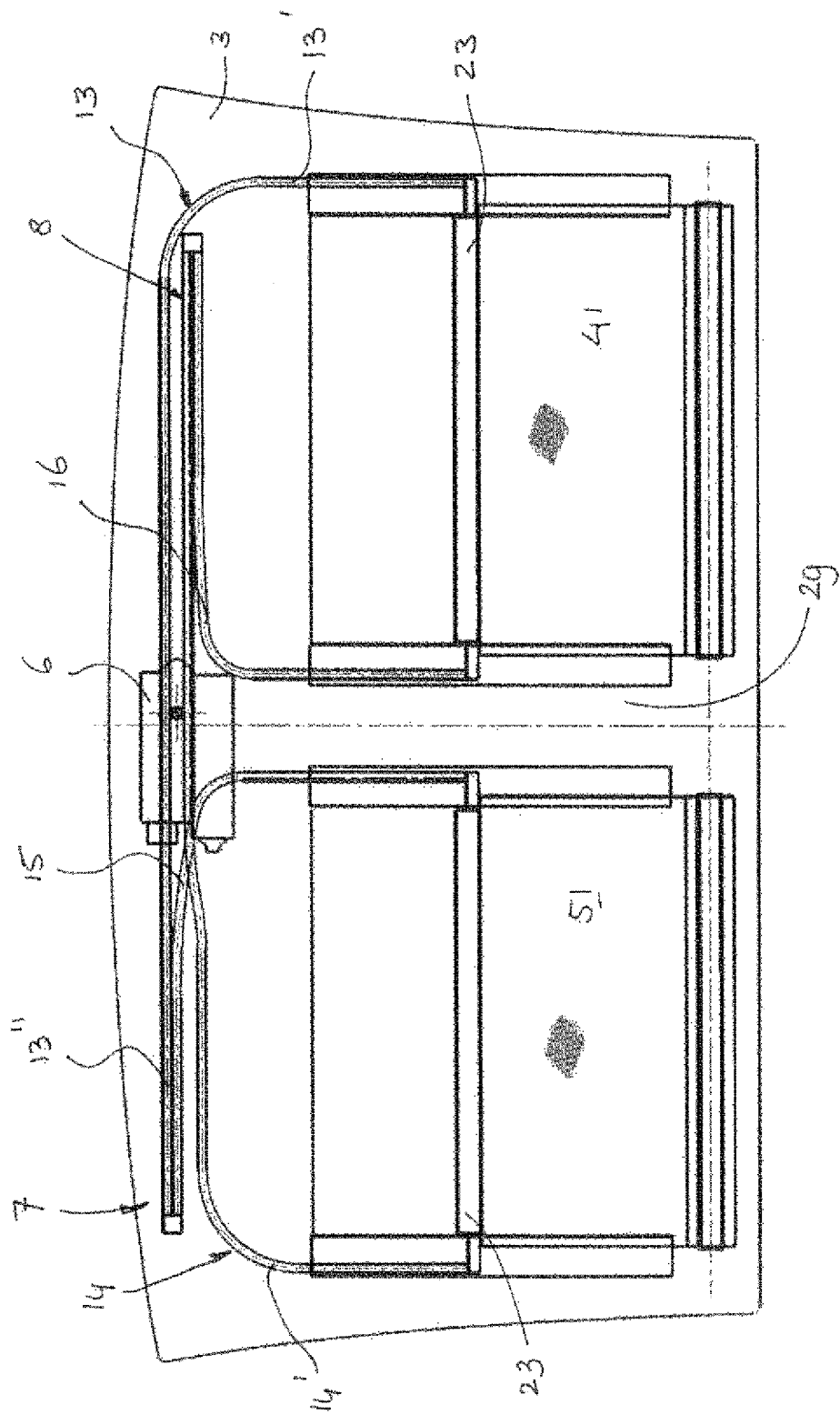

The embodiment of FIG. 17 is for the greater part similar to that of FIG. 16. Only the second parts 15, 16 of the first and second drive cable assemblies 7, 8 are switched so that the second part 15 of the first drive cable assembly 7 is connected to the operating beam 23 of the second windable sunscreen 51, while the elongated second part 16 of the second drive cable assembly 8 is connected to the operating beam 23 of the first windable sunscreen 41. Thus, in this embodiment, the movable parts, i.e. sunscreens, are driven by different parts of different drive cable assemblies.

This embodiment is optimized in view of cable lengths to limit friction, cost etc.

Figure 18:
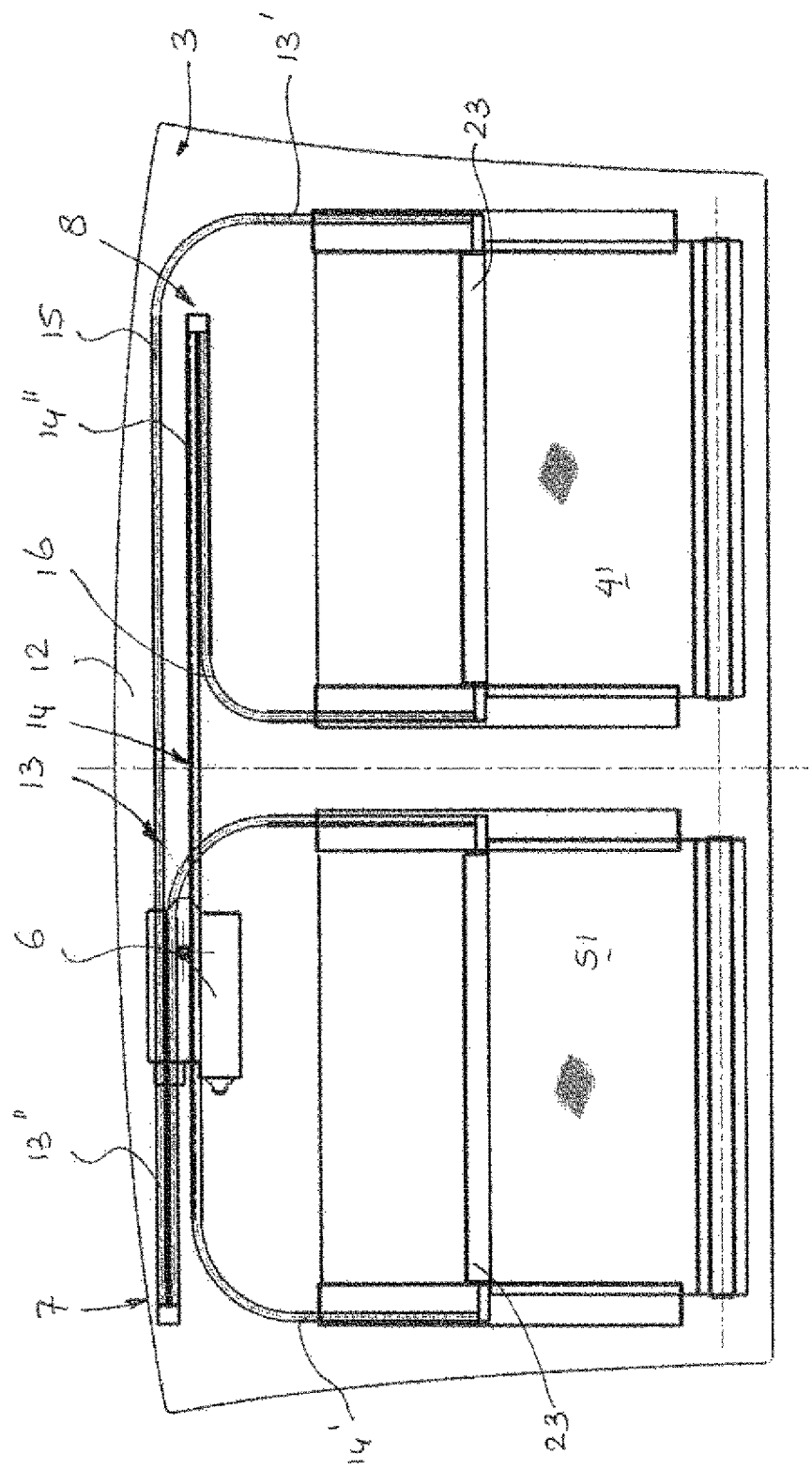

FIG. 18 shows another variation in which the cable paths are very similar to that of FIG. 17, but in which the motor 6 has been displaced such that the flexible first part 13 and the elongated second part 15 of the first drive cable assembly 7 have been switched due to the motor 6 driving just another part of the cable assembly 7. The part of the drive cable assembly 7, 8 that is engaged with the gear of motor 6 is the flexible first part 13, 14 and the part of the drive cable assembly 7, 8 that is connected or connectable to the flexible first part 13, 14 is the elongated second part 15, 16.

This embodiment is useful in situations where one movable element causes a higher resistance to the driving forces of the drive cable assembly than another one. The first end portions of the flexible first part can then be used to drive the movable element causing the higher resistance.

FIG. 19 shows an embodiment having different arrangements of the elongated second parts 15, 16. It also has a different position of the motor 6 which is now situated on a central longitudinal member or beam 29 of the frame 3 between the two windable sunscreens 41 and 51 which are again positioned side-by-side (with interposition of the longitudinal beam 29). The elongated second part 15 of the first drive cable assembly 7 is now connected to the first end portion 13' of the first flexible part 13 which drives the second movable part 15. This means that the second end portion 13" of the flexible first part 13 of the first drive cable assembly 7 has no function, but in principle it could be used to drive a third movable part, for example together with the second end portion 14' of the flexible first part 14 of the second drive cable assembly 8. As the elongated second part 15 of the first cable assembly 7 moves in the same direction as the flexible first part 13 of the first drive cable assembly 7, it could drive the same (first) movable part, but here it drives the second movable part or sunscreen 51.

The second end portion 14" of the flexible first part 14 of the second drive cable assembly 8 is now connected to two elongated second parts 16a, 16b, so in this embodiment, the flexible first part 14 is driven by motor 6, but is not directly connected to a movable part. But as already noted before, the first end part 14' of the flexible first part 14 of the second drive cable assembly 8 could be used to drive a third movable element. The elongated second parts 16a, 16b of the second drive cable assembly 8 are used to drive the two adjacent ends of the operating beams 23 of the two sunscreens 41, 51.

This embodiment is particularly advantageous in case the motor is positioned between the movable elements positioned side-by-side and to prevent small radii in the cable parts.

FIG. 20 shows how the second end portion 14" of the flexible first part 14 and the two elongated second parts 16a, 16b of the second drive cable assembly 8 are guided in parallel guiding channels 10, 17a, 17b and are fixedly connected to each other to transmit the driving force of the flexible first part 14 to the elongated second parts 16a, 16b by connecting parts 19a, 19b extending through narrow openings 22a, 22b.

It is noted that in general the guiding channels 10, 10' and 17, 17' for the second end portions 13", 14" of the flexible first parts 13, 14 and for the elongated second parts 15, 16 extend substantially parallel and side-by-side to each other at least along the length of travel of the continuous or temporary connection 19, 27. Only when the connection 19, 27 would be adjustable in length in a direction connecting the guiding channels it would allow a diversion of the guiding channels from these parallel paths.

FIGS. 21 and 22 show an alternative to the temporary connection 27 between the flexible first part 13, 14 and the elongated second part 15, 16 of FIG. 8. The temporary connection 27 here includes a pin-slot connection and a forcing guide either preventing or enabling a connection/disconnection between the flexible first part 13, 14 and the elongated second part 15, 16. The pin-slot connection comprises a pin 33 on a mount 34 to the flexible first part 13, 14. The pin 33 is configured to engage in and be disengaged from a slot 35 provided in a slide 36 which is pivotably connected to a mount 37 fixed to the elongated second part 15, 16. The pivotable slide 36 is biased toward a guide surface 38 which includes a recess 39 in which a protrusion 40 of the slot slide 36 can engage. The slot 35 comprises a straight first slot portion 35a extending parallel to the guide surface 38 when the protrusion 40 engages the recess 39 and comprises a short second slot portion 35b at an angle to the first slot portion 35a and at an angle to the guide surface 38 when the first and second cable parts 13, 15 or 14, 16 are connected by the temporary connection 27.

FIG. 21 shows the flexible first part 13, 14 and the elongated second part 15, 16 in connected condition. The pin 33 is engaged in the second slot portion 35b and the protrusion 40 is in contact with the guide surface 38 preventing a rotation of the slot slide 36 and thereby preventing the pin 33 from leaving the second slot portion 35b as the flexible first part 13, 14 and the pin 33 fixed to it cannot move in a direction away from the guide surface 38. Thus, the elongated second part 15, 16 moves with the flexible first part 13, 14 and thus drives the movable part to which it is connected. As soon as the protrusion 40 of the slot slide 36 arrives at the recess 39 in the guide surface 38, the protrusion 40 is urged into the recess 39 by a spring biasing force from a spring (not shown) connecting the mount 37 to the protrusion 40 such as but not limited to a torsion, tension, compression or leaf spring suitably connected to provide the spring bias force (or alternatively by the shape of the guide guiding the slide 36) and, due to this rotation, the second slot portion 35b moves relative to the pin 33, such that the pin 33 arrives in the first slot portion 35a which then extends parallel to the guide surface 38 and parallel to the direction of movement of the pin 33 so that the pin 33 moves through the first slot portion 35a and finally out of the slot 35. Thus, while the flexible first part 13, 14 continues to move, the elongated second part 15, 16 stops moving and is kept stationary until the pin 33 is back at the entrance of the second slot portion 35b to move the protrusion 40 out of the recess 39 and thereby restore the connection between the flexible first part 13, 14 and the elongated second part 15, 16 and disengage the lock between the slot slide 36 and the guide surface 38 and thereby the lock between elongated second part 15, 16 and the stationary part 3.

From the foregoing it will be clear that the invention provides an open roof system which has a solution for driving at least two movable elements which is cost effective and technically favorable. The invention offers many possibilities to arrange and combine drive cable assemblies to adapt to positions of the motor, positions and relative directions of movement of movable parts, and guide channel routings and radii.

The invention is not limited to the embodiments shown in the drawing and described herein before, which may be varied in different manners within the scope of the invention.

Aspects of different embodiments may be used in other combinations to create further drive cable arrangements for example.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims. For example, it is possible that at least one of the elongated second parts of the cable assembly is connected, either fixedly or through a temporary connection or coupling, to a further elongated second part (or third part etc.). It is also possible that elongated second parts are connected or connectable to both the first and second end portions of the flexible first part of the first and/or second drive cable assembly. Although generally two cable parts are used to drive a movable part, it is conceivable that only one cable part is required to drive a movable part, for example, if the movable part is not guided in two (lateral) guides, but in one (central) guide. The total number of cable parts could then be uneven.

The invention claimed is:

1. An open roof system for a vehicle having an opening in its fixed roof, comprising:
    a stationary part configured to be fixed to the roof,
    at least first and second movable elements, which are each movable between a retracted position and a deployed position,
    a motor configured to drive the movable elements at least partly between the retracted and deployed positions,
    at least first and second drive cable assemblies configured to transfer torque of the motor to said movable elements, wherein the stationary part comprises at least first and second guiding channels and guides for respectively guiding the drive cable assemblies and the movable elements, wherein the first and second drive cable assemblies comprise a flexible first part having first and second end portions, said flexible first part being driven by the motor such that said first end portion of said flexible first part is on one side of the motor and the second end portion is on the other side of the motor and said second end portion is guided in the first guiding channel, wherein each of the first and second drive cable assemblies further comprises an elongated second part guided in the second guiding channel, wherein at least a part of the second guiding channel extends side-by-side to the first guiding channel, and wherein, during at least part of the operation, said elongated second part is driven by and is moved substantially in the same direction as the second end portion of the first part of the cable assembly at a position where the first and second guiding channels extend side-by-side, and wherein said flexible first parts and the second elongated parts of the first and second drive cable assemblies together drive said at least first and second movable elements.

2. The open roof system according to claim 1, wherein the elongated second part of the drive cable assembly is separate from the first part.

3. The open roof system according to claim 2, wherein the first and second parts are connected by a separate connecting part.

4. The open roof system according to claim 1, wherein the elongated second part of the drive cable assembly is an extension of the flexible first part.

5. The open roof system according to claim 1, wherein the second part is continuously immovably connected to the flexible first part.

6. The open roof system according to claim 2, wherein the second part is temporarily connected to the flexible first part by a temporary connecting part, such that during a movement between two positions of the first movable element, the second elongated part is disconnected from the flexible first part, such that the second moveable element is substantially stationary.

7. The open roof system according to claim 1, wherein the elongated second part is a flexible part having the same properties as the flexible first part.

8. The open roof system according to claim 3, wherein the first and second guiding channels have lateral openings extending along the length of the guiding channels, wherein the lateral openings face each other, and wherein the connecting part projects through said openings.

9. The open roof system according to claim 1, wherein the first and second guiding channels have lateral openings extending along the length of the guiding channels, wherein the lateral openings face each other, and wherein the first part and second part are made of one piece with a portion projecting through said openings.

10. The open roof system according to claim 6, wherein the first and second guiding channels have lateral openings extending along the length of the guiding channels, wherein the lateral openings face each other, and wherein a part of the temporary connection projects through said openings.

11. The open roof system according to claim 1, wherein the at least first and second movable elements are windable sunscreens or stackable sunscreens.

12. The open roof system according to claim 1, wherein the at least first and second movable elements comprise a closure assembly configured to close the opening in the fixed roof of the panel.

13. The open roof system according to claim 1, wherein the at least first and second movable elements are a closure element configured to close an opening in the fixed roof and a slide configured to raise a wind deflector to deflect the wind when the closure element is in an open position.

14. The open roof system according to claim 1, wherein the elongated second part is connected to a mechanism for the movement of the first or second movable element.

15. The open roof system according to claim 1, wherein the motor is positioned substantially in between the first and the second movable elements.

16. The open roof system according to claim 1, wherein the first part of the drive cable assembly runs substantially from one lateral guide to the opposite lateral guide.

17. The open roof system according to claim 1, wherein the first and second drive cable assemblies each have a flexible first part and at least one elongated second part.

18. The open roof system according to claim 1, wherein the first end portion of the flexible first part of the first drive cable assembly is connected to one of the first and second movable parts, and wherein the second end portion of the flexible first part is connected, at least during part of the operation, to the elongated second part which is connected to one of the first and second movable parts.

19. The open roof system according to claim 1, wherein the flexible first part and the second part of each of the first and second drive cable assembly is connected to one of the movable elements.

20. The open roof system according to claim 19, wherein the flexible first parts of the first and second drive cable assemblies are connected to the first movable element and the elongated second parts of the first and second drive cable assemblies are connected to the second movable elements.

21. The open roof system according to claim 17, wherein the flexible first part of the first drive cable assembly and the elongated second part of the second drive cable assembly is connected to one of the movable elements.

22. The open roof system according to claim 1, wherein the flexible first part of the first drive cable assembly is connected, during at least a part of the operation, to at least two elongated second parts.

23. The open roof system according to claim 22, wherein the at least two elongated second parts are connected to the end of the first end portion of the flexible first part.

24. The open roof system according to claim 1, wherein the first end portion of the flexible first part of the first drive cable assembly is connected to one of the first and second movable parts, and wherein the first end portion of the flexible first part is connected, at least during part of the operation, to the elongated second part which is connected to one of the first and second movable parts.

25. An open roof system for a vehicle having an opening in its fixed roof, comprising:
   a stationary part configured to be fixed to the roof,
   at least first and second movable elements, which are each movable between a retracted position and a deployed position,
   a motor configured to drive the movable elements at least partly between the retracted and deployed positions,
   at least two drive cable assemblies configured to transfer torque of the motor to said movable elements, wherein the stationary part comprises at least first and second guiding channels and laterally positioned guides for respectively guiding the drive cable assemblies and the movable elements, whereby the drive cable assemblies comprise a flexible first part having first and second ends, said first part being driven by the motor, and wherein said first end of said flexible first part is connected to the first movable element, in a first direction, and said second end is guided in a first guiding channel in one of the lateral guides, said second end oriented in a direction substantially parallel to the first end towards said first movable element, and wherein the drive cable assembly further comprises an elongated second part, guided in a second guiding channel in a second direction towards said second movable element and connected thereto, in that the second guiding channel is oriented substantially parallel to the first guiding channel in said one of the lateral guides, and in that, during at least part of the operation, said elongated second part moves substantially in the same direction as the second end of the first part of the cable assembly.

* * * * *